US010764590B2

(12) United States Patent
Maaninen

(10) Patent No.: US 10,764,590 B2
(45) Date of Patent: Sep. 1, 2020

(54) ENTROPY CODING PRIMARY AND SECONDARY COEFFICIENTS OF VIDEO DATA

(71) Applicant: GOOGLE LLC, Mountain View, CA (US)

(72) Inventor: Juha Pekka Maaninen, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 176 days.

(21) Appl. No.: 15/813,405

(22) Filed: Nov. 15, 2017

(65) Prior Publication Data
US 2019/0149829 A1 May 16, 2019

(51) Int. Cl.
*H04N 19/18* (2014.01)
*H04N 19/159* (2014.01)
*H04N 19/91* (2014.01)
*H04N 19/124* (2014.01)
*H04N 19/13* (2014.01)

(52) U.S. Cl.
CPC ........... *H04N 19/18* (2014.11); *H04N 19/124* (2014.11); *H04N 19/13* (2014.11); *H04N 19/159* (2014.11); *H04N 19/91* (2014.11)

(58) Field of Classification Search
None
See application file for complete search history.

(56) References Cited

U.S. PATENT DOCUMENTS

| 7,804,903 B2 | 9/2010 | Haque et al. | |
| 9,413,387 B2 | 8/2016 | Fenney | |
| 2012/0020408 A1* | 1/2012 | Chen | H03M 7/40 375/240.03 |
| 2014/0086307 A1* | 3/2014 | Karczewicz | H04N 19/70 375/240.02 |

(Continued)

OTHER PUBLICATIONS

International Search Report and Written Opinion in PCT/US2018/047204, dated Oct. 26, 2018, 17 pgs.

(Continued)

*Primary Examiner* — Michael J Hess
(74) *Attorney, Agent, or Firm* — Young Basile Hanlon & MacFarlane, P.C.

(57) ABSTRACT

Primary and secondary coefficients are identified and used for entropy coding to improve performance. When coding quantized transform coefficients of a transform block, one of those quantized transform coefficients is identified as a primary coefficient. A coefficient map indicating locations of ones of the quantized transform coefficients within the transform block is produced. Valid secondary coefficient associated with the primary coefficient are identified using the coefficient map and data indicating a location of a last non-zero coefficient within the transform block. A token class used to encode one or more neighbor coefficients of the primary coefficient and the valid secondary coefficients is then identified, and a number of bits to use to code the primary coefficient and the valid secondary coefficients is determined based on the token class. The number of bits is determined based on data retrieved from a hardware register and thus determined in a single clock cycle.

20 Claims, 9 Drawing Sheets

(56) References Cited

U.S. PATENT DOCUMENTS

| | | | |
|---|---|---|---|
| 2014/0307807 A1* | 10/2014 | Gamei | H03M 7/4018 375/240.26 |
| 2016/0007046 A1* | 1/2016 | Chou | H04N 19/13 375/240.02 |
| 2016/0191917 A1 | 6/2016 | Fu et al. | |
| 2017/0127058 A1* | 5/2017 | Misra | H04N 19/70 |

OTHER PUBLICATIONS

Junlin Li et al., "Context-adaptive hybrid variable length coding in H.264/AVC", 16th IEEE International Conference on Image Processing (ICIP), 2009, IEEE (Piscataway, NJ), Nov. 7, 2009, pp. 3437-3440.

Yian Xu et al., "Context-adaptive hybrid variable length coding", Joint Collaborative Team on Video Coding (JCT-VC) of ITU-T SG16 WP3 and ISO/IEC JTC1/SC29/WG11, 3rd Meeting, Guangzhou, CN, Oct. 7-15, 2010, Doc. JCTVC-C152 (Oct. 11, 2010), pp. 1-4.

Woo-Jin Han et al., "CE1 response: grouped and run-length VLC of repred and cpb", Joint Video Team (JVT) of ISO/IEC MPEG & ITU-T VCEG (ISO/IEC JTC1/SC29/WG11 and ITU-T SG16 Q.6), 19th Meeting, Geneva, Switzerland, Mar. 31-Apr. 7, 2006, Doc. JVT-S029 (Mar. 28, 2006), pp. 1-14.

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

* cited by examiner

900

| Bit offset | # bits | Name | Description |
|---|---|---|---|
| 0 | 10 | EOB | Bits to encode EOB token, i.e. more_coefs = 0 |
| 10 | 10 | ZERO | Bits to encode coefficient '0' and more_coefs = 1 |
| 20 | 10 | ONE | Bits to encode coefficient '1' and more_coefs = 1 |
| 30 | 10 | TWO | Bits to encode coefficient '2' and more_coefs = 1 |
| 40 | 10 | THREE | Bits to encode coefficient '3' and more_coefs = 1 |
| 50 | 10 | FOUR | Bits to encode coefficient '4' and more_coefs = 1 |
| 60 | 10 | CAT0 | Bits to encode coefficient category 0 and more_coefs = 1. Extra bits per category are calculated separately. |
| 70 | 10 | CAT1 | Bits to encode coefficient category 1 and more_coefs = 1. Extra bits per category are calculated separately. |
| 80 | 10 | CAT2 | Bits to encode coefficient category 2 and more_coefs = 1. Extra bits per category are calculated separately. |
| 90 | 10 | CAT3 | Bits to encode coefficient category 3 and more_coefs = 1. Extra bits per category are calculated separately. |
| 100 | 10 | CAT4 | Bits to encode coefficient category 4 and more_coefs = 1. Extra bits per category are calculated separately. |
| 110 | 10 | CAT5 | Bits to encode coefficient category 5 and more_coefs = 1. Extra bits per category are calculated separately. |
| 120 | 8 | NO_EOB | Cost of encoding more_coefs = 1 |

FIG. 9

ENTROPY CODING PRIMARY AND SECONDARY COEFFICIENTS OF VIDEO DATA

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for determining numbers of bits to use to encode quantized transform coefficients of a transform block according to an implementation of this disclosure comprises identifying one of the quantized transform coefficients as a primary coefficient. The method further comprises producing a coefficient map indicating locations of ones of the quantized transform coefficients within the transform block. The method further comprises, using the coefficient map and data indicating a location of a last non-zero coefficient within the transform block, identifying at least one valid secondary coefficient associated with the primary coefficient. The method further comprises identifying at least one token class used to encode one or more neighbor coefficients of the primary coefficient and one or more neighbor coefficients of the at least one valid secondary coefficient. The method further comprises determining, in a single clock cycle, a number of bits to use to encode the primary coefficient and the at least one valid secondary coefficient by accessing a hardware register that stores data associated with the at least one token class.

An apparatus for determining numbers of bits to use to encode quantized transform coefficients of a transform block according to an implementation of this disclosure comprises a processor configured to execute instructions stored in a non-transitory storage medium. The instructions include instructions to identify one of the quantized transform coefficients as a primary coefficient. The instructions further include instructions to produce a coefficient map indicating locations of ones of the quantized transform coefficients within the transform block. The instructions further include instructions to identify at least one valid secondary coefficient associated with the primary coefficient. The at least one valid secondary coefficient is located before a last non-zero coefficient within the transform block. The instructions further include instructions to identify at least one token class used to encode one or more neighbor coefficients of the primary coefficient and one or more neighbor coefficients of the at least one valid secondary coefficient. The instructions further include instructions to determine a number of bits to use to encode the primary coefficient and the at least one valid secondary coefficient based on the at least one token class.

A method for determining numbers of bits to use to encode quantized transform coefficients of a transform block according to an implementation of this disclosure comprises identifying one of the quantized transform coefficients as a primary coefficient. The method further comprises identifying a quantized transform coefficient immediately following the primary coefficient within the transform block as a secondary coefficient. The method further comprises determining that the secondary coefficient is valid based on a value of the primary coefficient, a value of the secondary coefficient, and a location of a last non-zero quantized coefficient within the transform block. The method further comprises determining a context to use to encode the primary coefficient and the valid secondary coefficient using one or more neighbor coefficients of one or more of the primary coefficient or the valid secondary coefficient. The method further comprises determining a number of bits to use to encode the primary coefficient and the valid secondary coefficient based on the context.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

FIG. 9 is an illustration of a cost table reflecting numbers of bits required to code a token in a coding tree.

DETAILED DESCRIPTION

Figure 1:
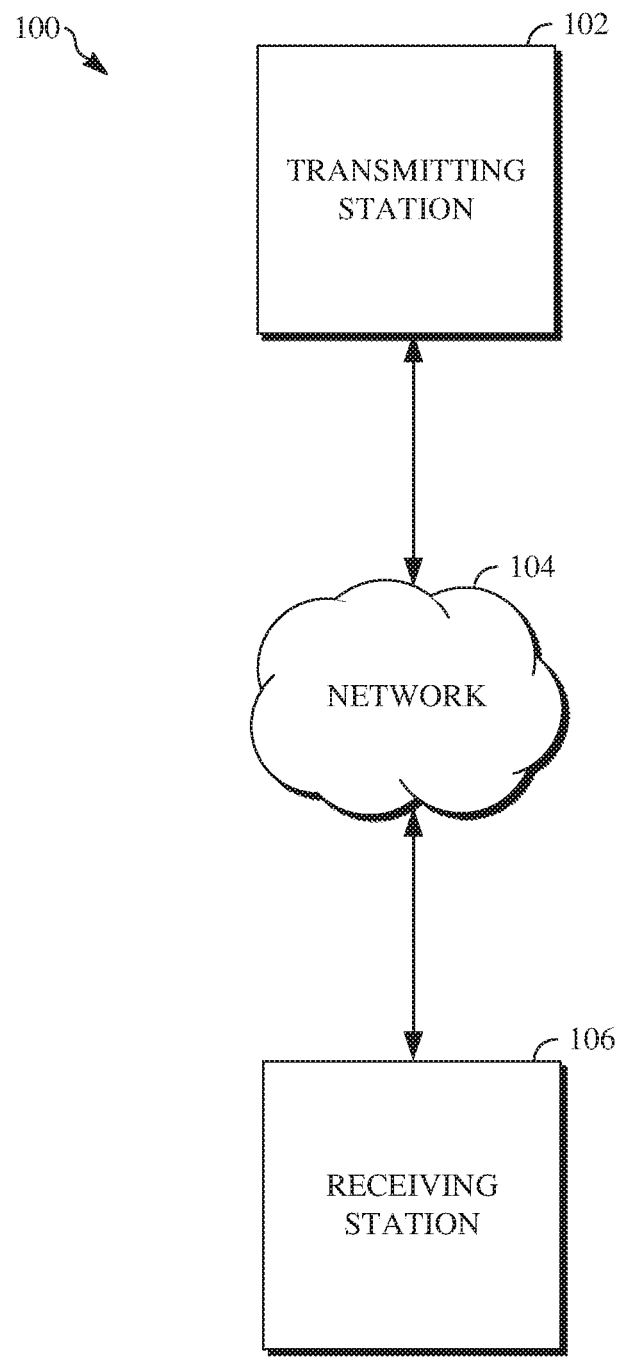
FIG. 1 is a schematic of a video encoding and decoding system.

Video compression schemes may include breaking respective images, or frames, into smaller portions, such as blocks, and generating an output bitstream using techniques to limit the information included for respective blocks in the output. An encoded bitstream can be decoded to re-create the source images from the limited information. Typical video compression and decompression techniques use entropy coding to further reduce the number bits required to encode video data to or decode video data from a bitstream. For example, entropy coding may include using probability models to determine the probable values of coefficients to encode to a bitstream, such as to reduce the amount of data that needs to be encoded to the bitstream after those coefficients are transformed and quantized.

The probability models used to code an above neighbor coefficient and a left neighbor coefficient of a current quantized transform coefficient are typically used to identify the probability model for coding the current quantized transform coefficient. This may, for example, be due to an expected spatial dependence or similarity between a current coefficient and its above and left neighbor coefficients. Thus, if the above and left neighbor coefficients each have a large magnitude, it is probable that the current quantized transform coefficient also has a large magnitude. However, if the above and left neighbor coefficients each have a value of zero, it is probable that the current quantized transform coefficient also has a value of zero.

The probabilities of a probability model reflect the likelihood that a particular syntax element of video data (e.g., a quantized transform coefficient of a transform block) will have a particular value (e.g., 0 or 1). The probabilities of a probability model may remain the same while the blocks of a given video frame are being encoded or decoded. Once each block of the video frame has been encoded or decoded, as applicable, the probabilities of the probability model used for the encoding or decoding can be updated to reflect new values as identified during such encoding or decoding. The probabilities are important to entropy coding because they are used to determine the number of bits required to code the syntax elements. For example, values that are more probable may be coded using fewer bits, whereas values that are less probable may be coded using more bits.

However, there may be a large number of probability models available for coding syntax elements, and so it may take a long time to access the probabilities needed to code multiple syntax elements. For example, in some cases, there may be as many as 576 probability models available. Each of those 576 probability models represents a permutation of variance parameters, for example, transform size (four possible values, for example, 4×4, 8×8, 16×16, and 32×32), plane (two possible values, for example, luminance and chrominance), prediction mode (two possible values, for example, inter prediction and intra prediction), band (six possible values, for example, 0 through 5), and context (six possible values, for example, 0 through 5).

Given the large number of possible probability models and that probability models are updated on a frame-by-frame basis, it may be desirable to store data representing the probability models in a static memory when using a hardware component for the coding. However, such static memory is limited to one access per clock cycle, meaning that it can take N clock cycles to access the probability models. This may create processing bottlenecks, for example, where high-bitrate content is involved.

Implementations of this disclosure address problems such as these by identifying and using primary and secondary coefficients of video data for entropy coding. A primary coefficient refers to a current quantized transform coefficient of a transform block to code. Secondary coefficients refer to quantized transform coefficients successively and immediately following the primary coefficient within the transform block. A number of secondary coefficients may be identified as valid using a coefficient map indicating locations of ones of the quantized transform coefficients within the transform block is produced and a location of a last non-zero coefficient within the transform block. A secondary coefficient is valid where the primary coefficient has a value of zero, the secondary coefficient has a value of zero, and the secondary coefficient is not the last non-zero coefficient in the transform block.

Once valid secondary coefficients are identified, a token class used to encode one or more neighbor coefficients of the primary coefficient and the valid secondary coefficients is then identified, and a number of bits to use to code the primary coefficient and the valid secondary coefficients is determined based on the token class. The token class refers to a category of a probability model used to code the neighbor coefficients and which therefore may be used to code the primary coefficient and the valid secondary coefficients. The number of bits may be determined based on data retrieved from a hardware register and thus determined in a single clock cycle. For example, the probability model used to code coefficients having a value of zero can be stored in a hardware register rather than a static memory. Where the primary coefficient and the valid secondary coefficients each has a value of zero, that hardware register can be accessed in a single clock cycle to identify probabilities for each of the primary coefficient and the valid secondary coefficients.

Further details of techniques for identifying and coding primary and secondary coefficients are described herein with initial reference to a system in which they can be implemented, such as shown in FIGS. 1 through 5. FIG. 1 is a schematic of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
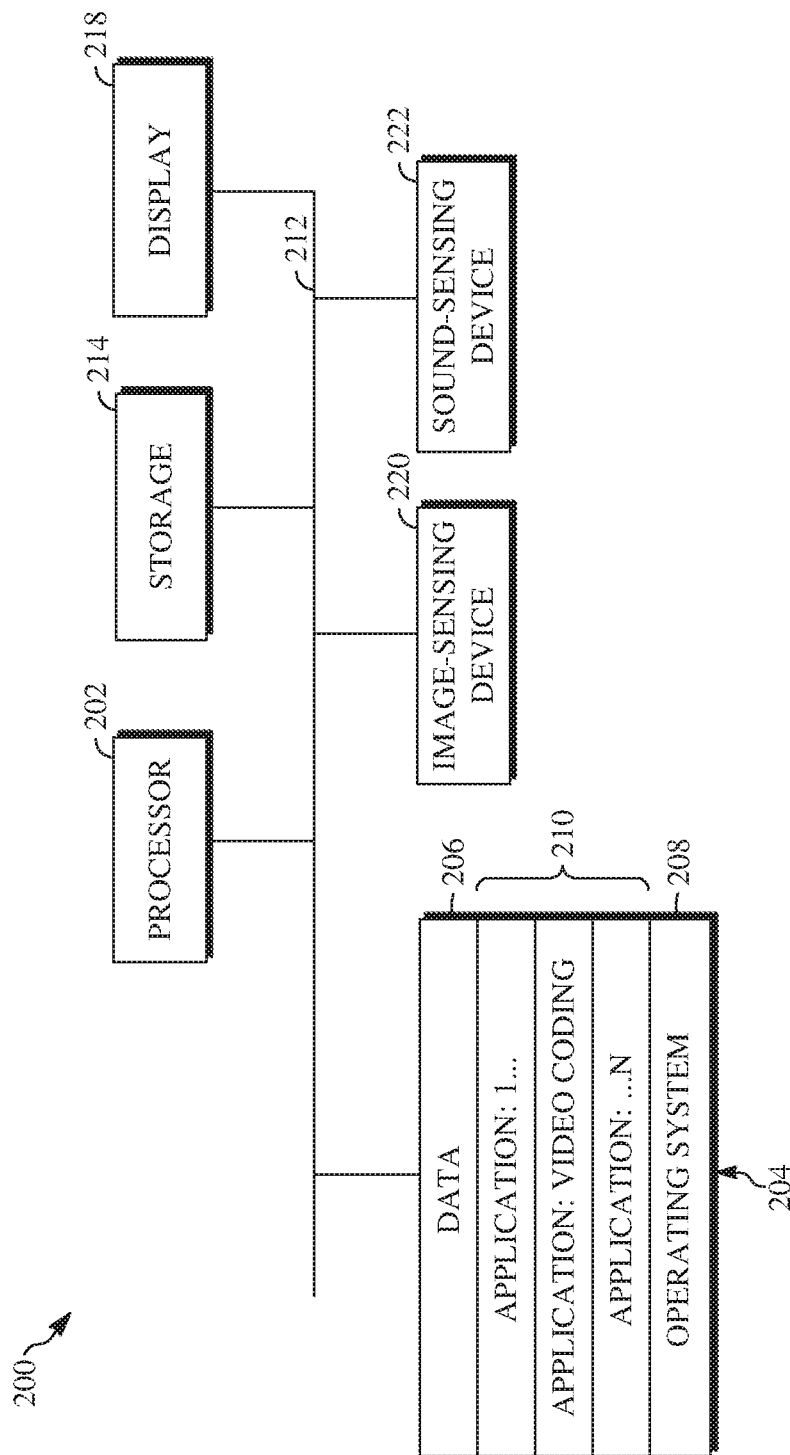
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
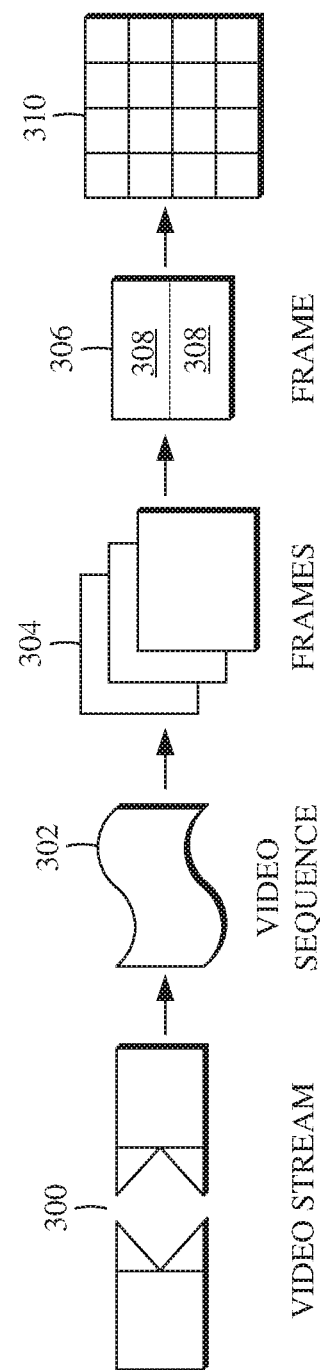
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
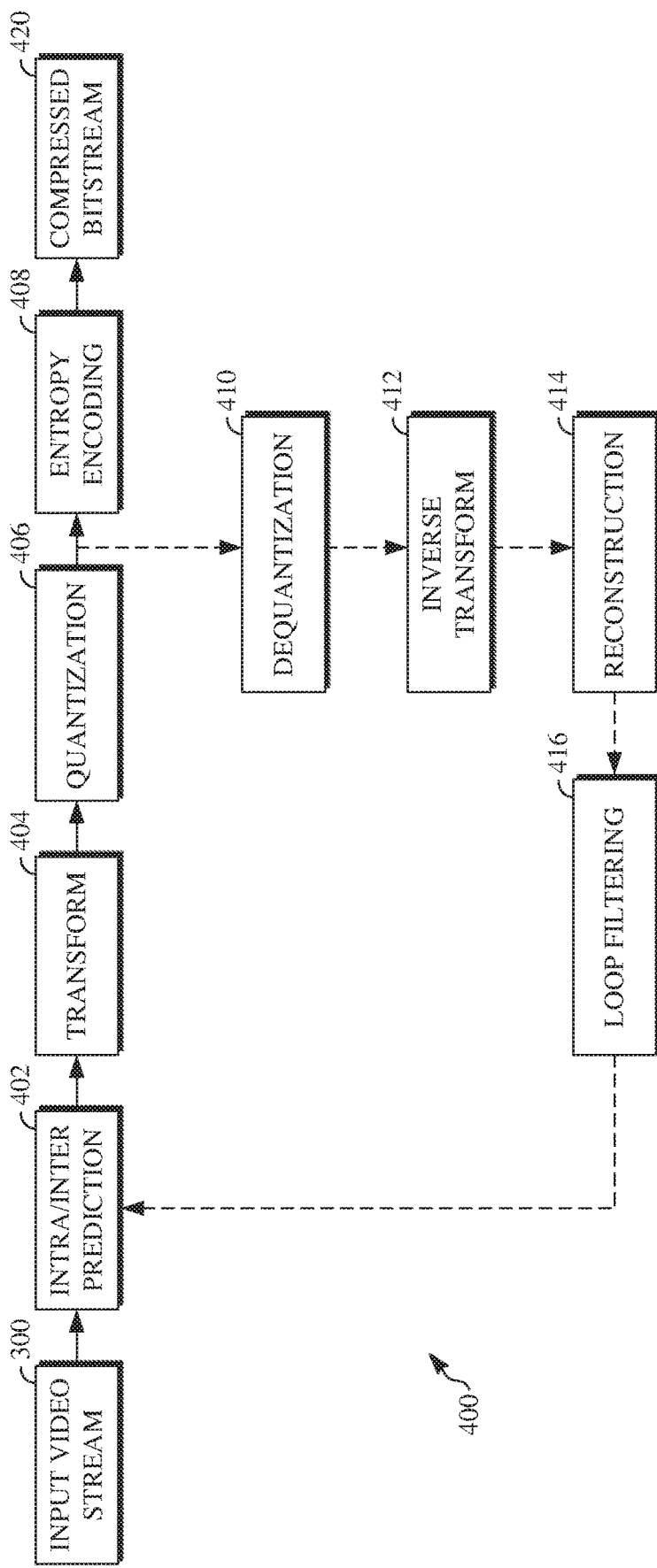
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
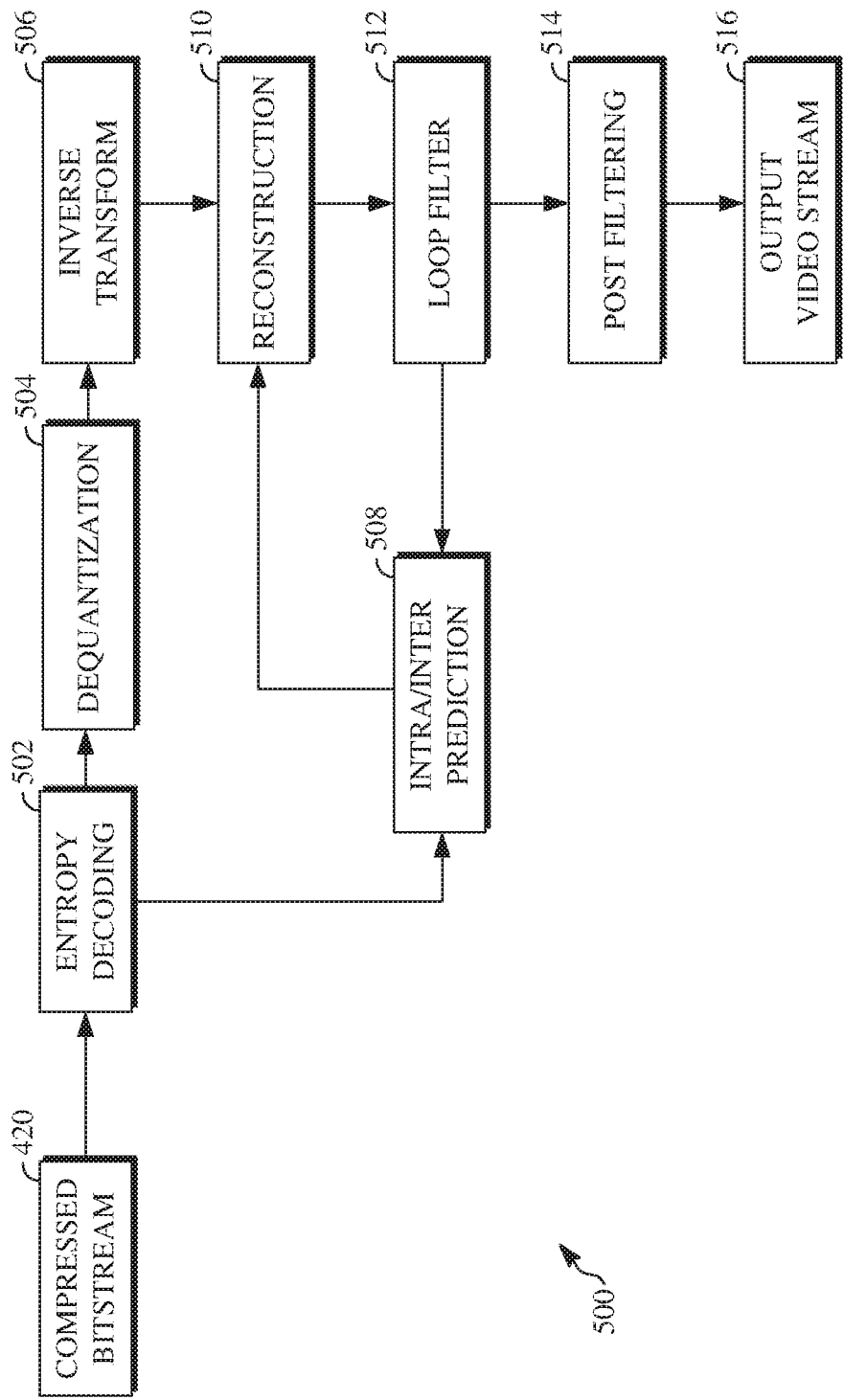
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the deblocking filtering stage 514.

Figure 6:
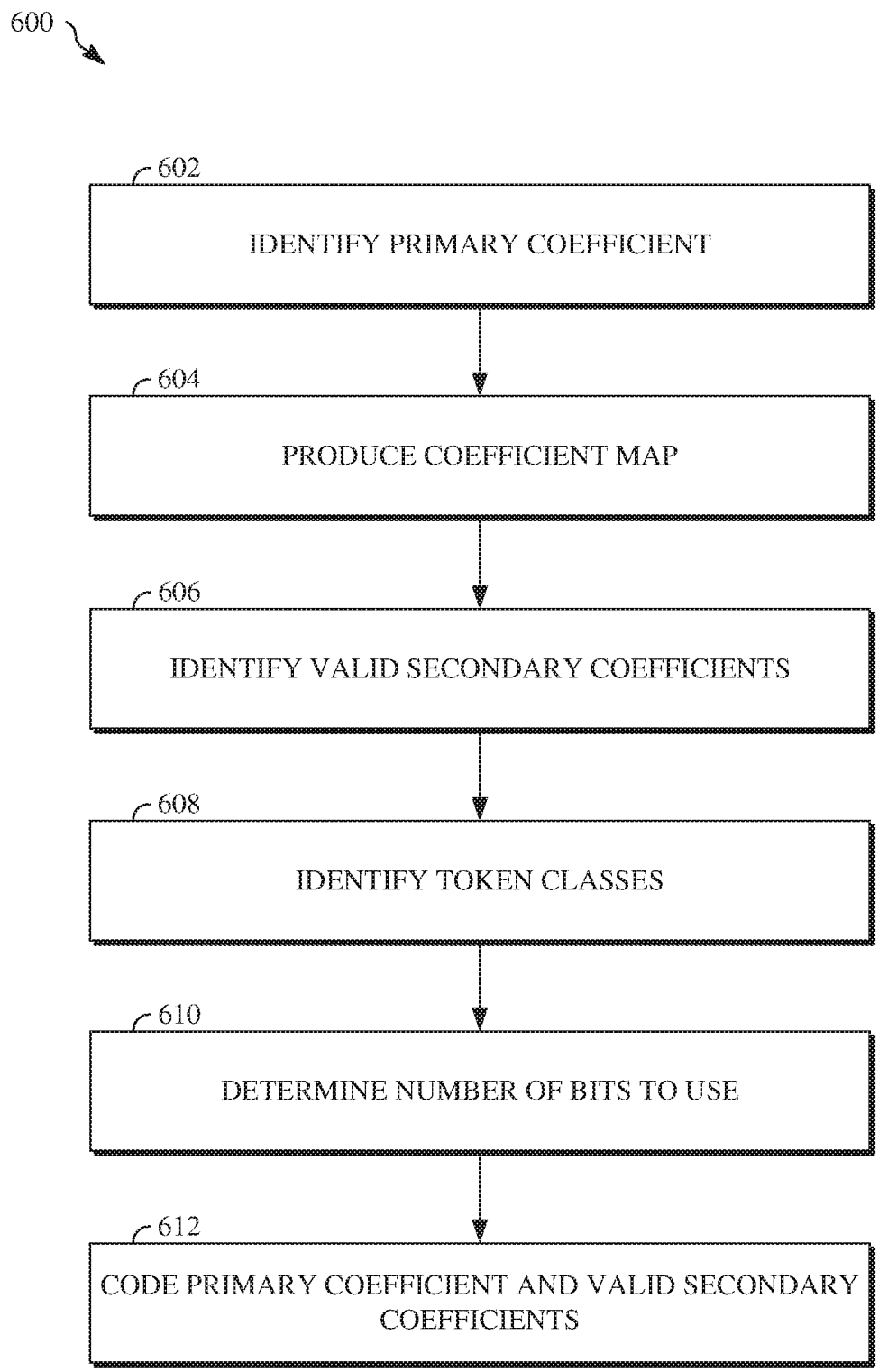
FIG. 6 is a flowchart diagram of an example of a technique for entropy coding primary and secondary coefficients of video data.
Figure 7:
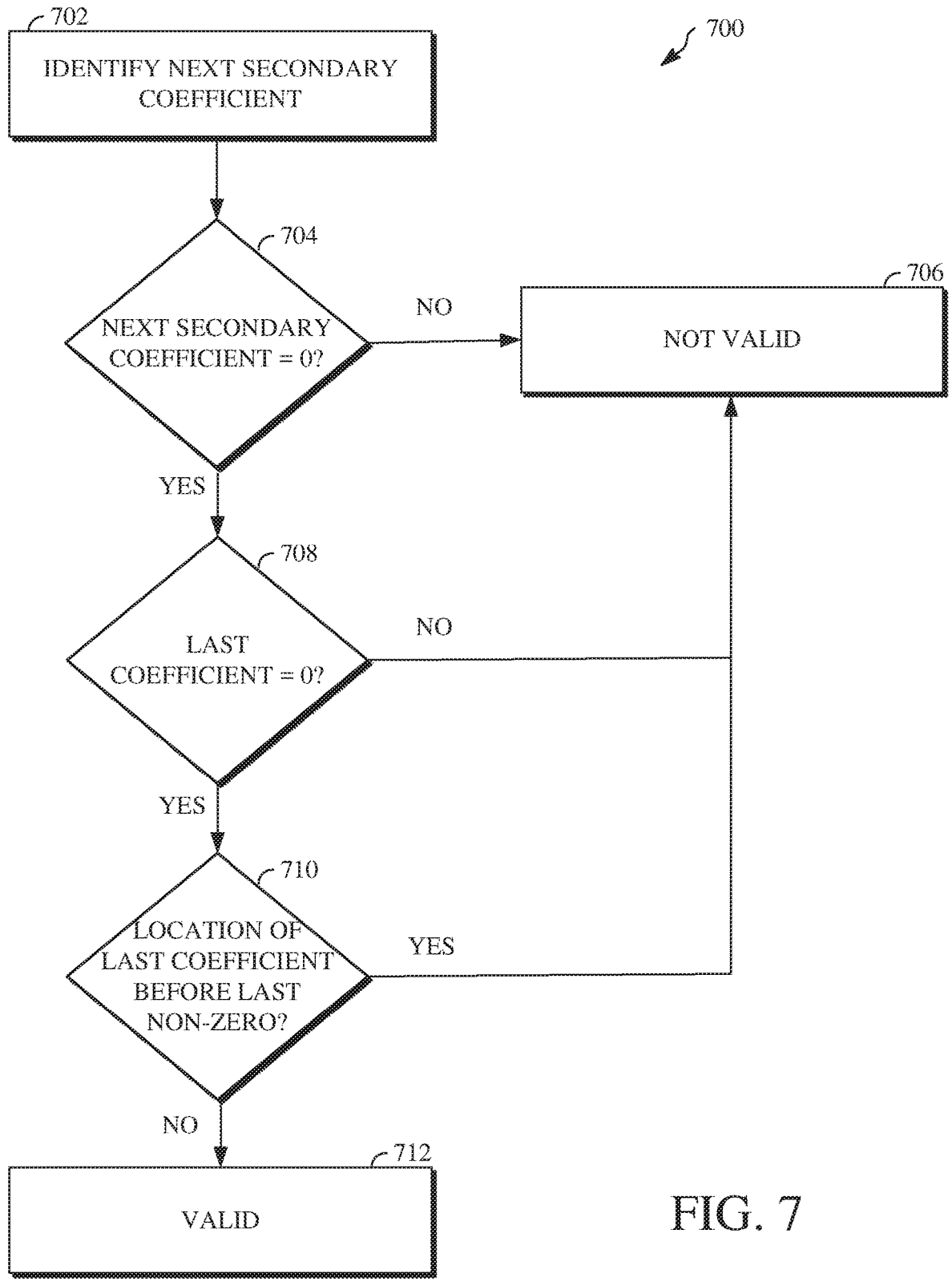
FIG. 7 is a flowchart diagram of an example of a technique for determining whether a secondary coefficient is valid.

Techniques for identifying and coding primary and secondary coefficients are now described with respect to FIGS. 6 and 7. FIG. 6 is a flowchart diagram of an example of a technique 600 for entropy coding primary and secondary coefficients of video data. FIG. 7 is a flowchart diagram of an example of a technique 700 for determining whether a secondary coefficient is valid. One or both of the technique 600 or the technique 700 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform one or both of the technique 600 or the technique 700. One or both of the technique 600 or the technique 700 can be implemented using specialized hardware or firmware. For example, a hardware component configured to perform one or both of the technique 600 or the technique 700 to encode or decode video data. As explained above, some computing devices may have multiple memories or processors, and the operations described in one or both of the technique 600 or the technique 700 can be distributed using multiple processors, memories, or both.

For simplicity of explanation, the technique 600 and the technique 700 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 6, a flowchart diagram of an example of a technique 600 for entropy coding primary and secondary coefficients of video data is shown. At 602, a primary coefficient is identified. The primary coefficient is one of a plurality of quantized transform coefficients of a transform block. For example, during encoding, the quantized transform coefficients may be output from a quantization stage, for example, the quantization stage 406 shown in FIG. 4. In another example, during decoding, the quantized transform coefficients may be output from a bitstream, such as the compressed bitstream 420 shown in FIG. 5. The primary coefficient may be a current coefficient of the quantized transform coefficients to be processed for encoding or decoding. For example, if none of the quantized transform coefficients has been processed yet, the primary coefficient is the first quantized transform coefficient. Alternatively, if N quantized transform coefficients have already been processed, the primary coefficient is the N+1th quantized transform coefficients. In some cases, identifying the primary coefficient can include selecting the primary coefficient from the transform block.

At 604, a coefficient map is produced. The coefficient map indicates the locations of the quantized transform coefficients within the transform block. For example, the coefficient map may indicate the locations within the transform block of quantized transform coefficients having a value of zero, the locations of non-zero quantized transform coefficients, or both. The location of a quantized transform coefficient is represented as an (x, y) coordinate or an index referring to an (x, y) coordinate. The size of a coefficient map can be based on the size of the transform block that includes the quantized transform coefficients (e.g., 4×4, 8×8, 16×16, 32×32, or the like).

At 606, valid secondary coefficients are identified. The valid secondary coefficients are associated with the primary coefficient. The valid secondary coefficients are identified using the coefficient map and data indicating a location of a last non-zero coefficient within the transform block. There may be N (e.g., three) valid secondary coefficients identified for the primary coefficient. For example, where there may be up to three valid secondary coefficients, the valid secondary coefficients include a first secondary coefficient, a second secondary coefficient, and a third secondary coefficient.

The first secondary coefficient immediately follows the primary coefficient within the transform block (e.g., the location of the first secondary coefficient within the transform block is immediately after the location of the primary coefficient within the transform block). The second secondary coefficient immediately follows the first secondary coefficient within the transform block (e.g., the location of the second secondary coefficient within the transform block is immediately after the location of the first secondary coefficient within the transform block). The third secondary coefficient immediately follows the second secondary coefficient within the transform block (e.g., the location of the third secondary coefficient within the transform block is immediately after the location of the second secondary coefficient within the transform block).

The first secondary coefficient, the second secondary coefficient, and the third secondary coefficient are sequentially identified. For example, if it is determined that the first secondary coefficient is not valid, the second secondary coefficient and the third secondary coefficient are not evaluated, and the first secondary coefficient is not used. In another example, if it is determined that the first secondary coefficient is valid, but that the second secondary coefficient is not valid, the third secondary coefficient is not evaluated and the second secondary coefficient is not used, although the first secondary coefficient is used. Implementations and examples for determining whether a secondary coefficient is valid are described below with respect to FIG. 7.

At 608, token classes are identified for the primary coefficient and the valid secondary coefficients. The token classes are token classes used to encode one or more neighbor coefficients of the primary coefficient and the at least one valid secondary coefficient. For example, a first token class associated with an above neighbor coefficient of the primary coefficient is identified based on locations of above neighbor coefficients of at least one of the first secondary coefficient, the second secondary coefficient, or the third secondary coefficient within the transform block. In another example, a second token class associated with a left neighbor coefficient of the primary coefficient is identified based on locations of left neighbor coefficients of the at least one of the first secondary coefficient, the second secondary coefficient, or the third secondary coefficient within the transform block. Examples of token classes and a table for storing token classes are described below with respect to FIG. 9.

The token classes specifically may refer to probabilities available to band 5 coefficients. That is, the primary coefficient and valid secondary coefficients may be band 5 coefficients within the transform block such that they are the farthest coefficients from a coefficient located at (0, 0) with respect to (x, y) planes. In such a case, instead of having 576 probability models available for coding the primary and valid secondary coefficients, there may instead be 96 probability models. A table including 96 elements, wherein each element refers to one of those 96 probability models, may be stored in hardware registers of a hardware component performing the technique 600.

At 610, a number of bits to use to code the primary coefficient and the valid secondary coefficients is determined. The number of bits can be determined based on the token classes identified for the primary coefficient and the valid secondary coefficients. For example, the context to use to encode at least one of the primary coefficient, the first secondary coefficient, the second secondary coefficient, or the third secondary coefficient can be determined based on the first token class and the second token class identified above (e.g., with respect to above and left neighbor coefficients). A bit cost may then be retrieved for the context from a hardware register, and the number of bits may then be determined based on the bit cost. A context may, for example, be or otherwise refer to a probability or probability model, such as any of those terms are described in the VP9 video coding standard.

The context reflects a probability that a quantized transform coefficient of the quantized transform coefficients has a value of zero. The hardware register stores 10 bits for the context. For example, those 10 bits may refer to the bits stored for ones of the 96-element table stored in hardware registers that are used for coding zero-valued coefficients. Since the number of bits is determined by accessing a hardware register once for all of the primary and valid secondary coefficients, the number of bits to use to encode the primary coefficient, the first secondary coefficient, the second secondary coefficient, and the third secondary coefficient is determined in a single clock cycle.

After the primary coefficient and its valid secondary coefficients have been processed, the technique 600 may be repeated for a next primary coefficient. The next primary coefficient may thus be identified as a quantized transform coefficient immediately following the last valid secondary coefficient within the transform block. For example, when the previously identified primary coefficient had three valid secondary coefficients associated with it, the location of the next primary coefficient within the transform block is immediately after the location of the third such valid secondary coefficient within the transform block.

In some implementations, after the primary and valid secondary coefficients have been processed, the technique 600 can include determining whether the transform block includes an end of block token. For example, this can be determined using the transform size of the transform block and the location of the last non-zero coefficient of the transform block.

In some implementations, the technique 600 includes determining numbers of blocks to use to code primary coefficients that are non-zero coefficients and therefore do not have valid secondary coefficients associated therewith. For example, a cost table stored in a static memory can be accessed to identify an entry, and thus a cost, for coding the coefficient based, for example, on the transform block type, the band in which the coefficient is located, the context for the coefficient from its above and/or left neighbor coefficients, as available, and a value of a last-processed coefficient.

Although the example used for describing the technique 600 refers to encoding, the technique 600 may, in at least some cases, also be used for decoding. For example, a portion of probabilities usable for syntax elements may also be stored in hardware registers for decoding. The decoder would decode a coefficient by first determining the probability model to use for a next coefficient to decode, then retrieve the probabilities for that probability model, such as from a hardware register. The decoder would then use the retrieved probabilities to decode syntax elements from the bitstream. As such, once a probability model to use for a next coefficient is identified, a determination can be made as to whether the probabilities therefore are stored in a hardware register. If they are, the static memory access can be skipped for the coefficient.

Referring next to FIG. 7, is a flowchart diagram of an example of a technique 700 for determining whether a secondary coefficient is valid is shown. At 702, a next secondary coefficient is identified. For example, if no secondary coefficients have been identified yet for a primary coefficient, the next secondary coefficient is the first secondary coefficient and the coefficient immediately preceding the next secondary coefficient within the transform block is the primary coefficient. In another example, if one secondary coefficient has already been processed for a primary coefficient, the next secondary coefficient is the second secondary coefficient and the coefficient immediately preceding the next secondary coefficient within the transform block is the first secondary coefficient.

At 704, a determination is made as to whether the value of the next secondary coefficient is zero. This is because a secondary coefficient is valid only if it has a value of zero. That is, the primary coefficient also has a value of zero. A probability model reflecting the probability that a value is zero can be updated or otherwise accessed once for multiple coefficients that also have a value of zero.

At 706, responsive to a determination that the next secondary coefficient is a non-zero coefficient, the next secondary coefficient is determined to not be valid. If the next secondary coefficient is not valid, no further secondary coefficients are evaluated for the primary coefficient such that the technique 700 is not repeated for that primary coefficient. In such a case, the next secondary coefficient that is determined to not be valid may not be used to code the primary coefficient or otherwise update a probability model used to code the primary coefficient.

At 708, responsive to a determination that the value of the next secondary coefficient is zero, a determination is made as to whether the value of a coefficient immediately preceding the next secondary coefficient within the transform block is zero. Responsive to a determination that the coefficient immediately preceding the next secondary coefficient within the transform block is a non-zero coefficient, the technique 700 proceeds to 706, where the next secondary coefficient is determined to not be valid.

However, at 710, responsive to a determination that the value of the coefficient immediately preceding the next secondary coefficient within the transform block is zero, a determination is made as to whether a location of the coefficient immediately preceding the next secondary coefficient within the transform block is before a location of the last non-zero coefficient within the transform block.

At 712, responsive to a determination that the location of the coefficient immediately preceding the next secondary coefficient within the transform block is before the location of the last non-zero coefficient within the transform block, the next secondary coefficient is determined to be valid. Alternatively, responsive to a determination that the location of the coefficient immediately preceding the next secondary coefficient within the transform block is not before the location of the last non-zero coefficient within the transform block, the technique 700 proceeds to 706, where the next secondary coefficient is determined to not be valid.

The technique 700 can be repeated to accommodate identifications of multiple valid secondary coefficients. For example, where up to three secondary coefficients may be identified and used, the first secondary coefficient is identified as valid responsive to determining that the first secondary coefficient has a value of zero, that the primary coefficient has a value of zero, and that a location of the primary coefficient within the transform block is before the location of the last non-zero coefficient within the transform block. The second secondary coefficient is identified as valid responsive to determining that the second secondary coefficient has a value of zero, that the first secondary coefficient is valid, and that a location of the first secondary coefficient within the transform block is before the location of the last non-zero coefficient within the transform block. The third secondary coefficient is identified as valid responsive to determining that the third secondary coefficient has a value of zero, that the second secondary coefficient is valid, and that a location of the second secondary coefficient within the transform block is before the location of the last non-zero coefficient within the transform block.

In some implementations, the determinations at 704, 708, and 710 can be reordered such that they occur in a different order than shown in FIG. 7. In some implementations, the determinations at 704, 708, and 710 can be combined such that the technique 700 includes one or two determination operations instead of three.

Figure 8:
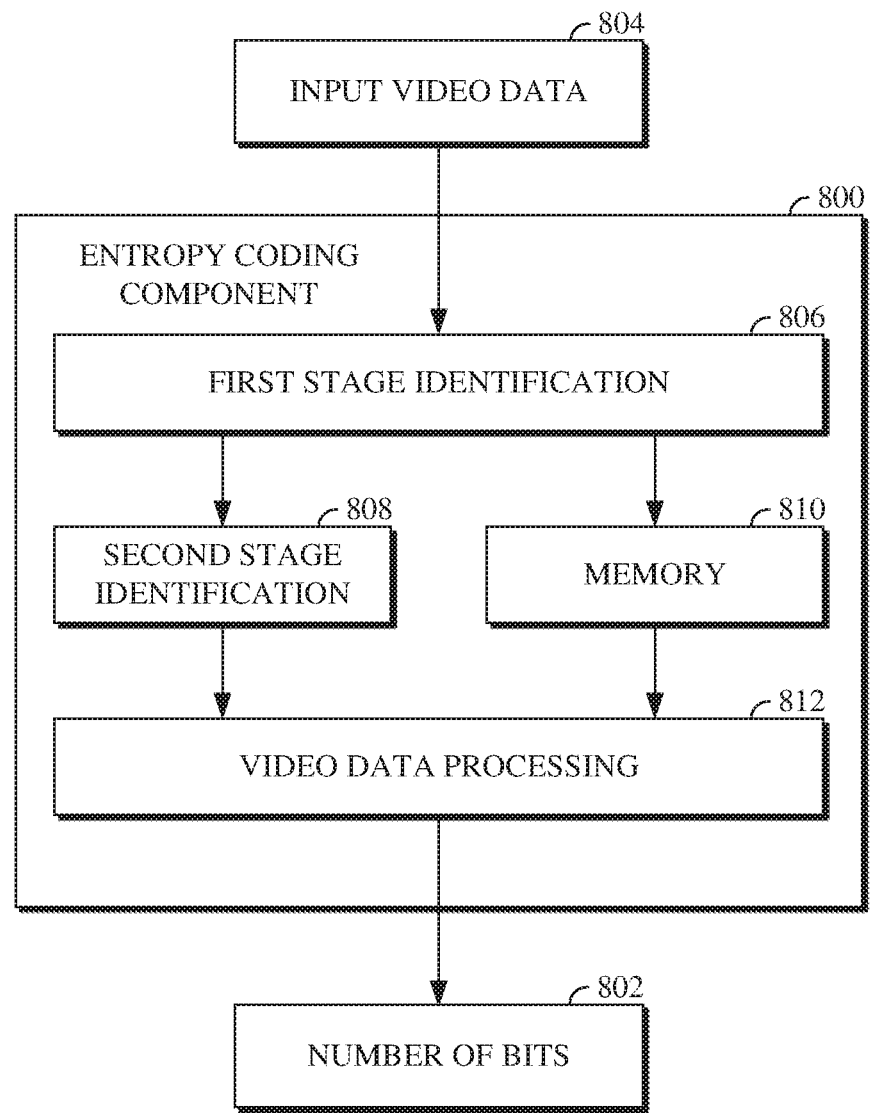
FIG. 8 is a block diagram of an entropy coding component used for coding video data using hardware registers.

FIG. 8 is a block diagram of an entropy coding component 800 used for coding video data using hardware registers. The entropy coding component 800 is used to determine a number of bits 802 to use to code input video data 804, such as to or from a bitstream using all or a portion of the technique 600 and/or the technique 700 shown in FIGS. 6 and 7, respectively. The input video data 804 may, for example, represent quantized transform coefficients output by the quantization stage 406 shown in FIG. 4 or received from the compressed bitstream 420 shown in FIG. 5. The entropy coding component 800 may, for example, represent a component used to perform one or more operations of the entropy encoding stage 408 shown in FIG. 4 and/or a component used to perform one or more operations of the entropy decoding stage 502 shown in FIG. 5.

The entropy coding component 800 includes a first stage identification module 806, a second stage identification module 808, a memory module 810, and a video data processing module 812. The first stage identification module 806 receives the input video data 804 (e.g., from the quantization stage 406 shown in FIG. 4 during encoding or from the compressed bitstream 420 shown in FIG. 5 during decoding). For example, where the input video data 804 are quantized transform coefficients, the first stage identification module 806 reads each of the quantized transform coefficients to identify the values of the quantized transform coefficients.

The first stage identification module 806 can produce a coefficient map indicating the locations of some or all of the quantized transform coefficients. For example, the coefficient map may indicate the locations of coefficients having a value of zero, the locations of non-zero coefficients, or both. Alternatively, the first stage identification module 806 can produce a combined coefficient map indicating the locations of all coefficients regardless of value and a non-zero coefficient map indicating the locations of non-zero coefficients. The location of a coefficient is represented as an (x, y) coordinate or an index referring to an (x, y) coordinate, regardless of the type of map produced. The size of a coefficient map can be based on the size of the transform block that includes the quantized transform coefficients (e.g., 4×4, 8×8, 16×16, 32×32, or the like).

The first stage identification module 806 may produce other data in addition to coefficient maps. For example, the first stage identification module 806 can produce data indicating the location of a last non-zero coefficient of a transform block, such as according to a scan order of that transform block. In another example, the first stage identification module 806 can produce a flag indicating whether any coefficients of the transform block are non-zero coefficients.

The first stage identification module 806 outputs data to the second stage identification module 808 for further processing. For example, the second stage identification module 808 can receive the non-zero coefficient map and the data indicating the location of the last non-zero coefficient of the transform block. The second stage identification module 808 uses the non-zero coefficient map and the data indicating the location of the last non-zero coefficient of the transform block to identify valid secondary coefficients for primary coefficients. For example, the second stage identification module 808 identifies a current coefficient as a primary coefficient and then checks whether the N (e.g., up to three) coefficients immediately following the primary coefficient in the non-zero coefficient map are valid secondary coefficients.

The second stage identification module 808 produces data associated with the primary coefficient and the number of valid secondary coefficients, if any. For example, the second stage identification module 808 can produce first data indicating a token class of an above neighbor coefficient of the primary coefficient, second data indicating a token class of a left neighbor coefficient of the primary coefficient, and third data indicating a number of valid secondary coefficients of the primary coefficient.

The second stage identification module 808 outputs the first data, the second data, and the third data to the video data processing module 812. The first data and the second data may be represented as tuples of three values each. As will be described below, the first data, second data, and third data are used by the video data processing module 812 to improve the coding efficiency for the input video data 804, for example, based on the number of secondary coefficients identified by the second stage identification module 808.

For example, where a primary coefficient is a non-zero coefficient, the first data is {0, 0, 0}, the second data is {0, 0, 0}, and the third data is 0. This is because the primary coefficient being a non-zero means that there are no secondary coefficients. However, where the primary coefficient has a value of zero, there may be secondary coefficients. In such a case, the second stage identification module 808 produces a validity map for the primary coefficient.

The validity map indicates whether the three secondary coefficients immediately following the primary coefficient are valid (e.g., such that each of those three secondary has a value of 0). For example, the validity map indicates that a first coefficient immediately following the primary coefficient is valid if that first coefficient has a value of 0 and the location of that first coefficient is less than the location of the last non-zero coefficient in the transform block. The validity map indicates that a second coefficient immediately following the first coefficient is valid if that second coefficient has a value of 0, the location of that second coefficient is less than the location of the last non-zero coefficient in the transform block, and the first coefficient is valid. The validity map indicates that a third coefficient immediately following the second coefficient is valid if that third coefficient has a value of 0, the location of that third coefficient is less than the location of the last non-zero coefficient in the transform block, and the second coefficient is valid.

In some cases, the context of a secondary coefficient may be dependent upon the context of the primary coefficient or of an earlier-located secondary coefficient (e.g., the context of the second coefficient may be dependent upon the context of the first coefficient, the context of the third coefficient may be dependent upon the context of the second coefficient, or both). For example, a value can be determined for an above neighbor context of each of the first coefficient, the second coefficient, and the third coefficient. These three values can represent the three values in the tuple of the first data. In another example, a value can be determined for a left neighbor context of each of the first coefficient, the second coefficient, and the third coefficient. These three values can represent the three values in the tuple of the second data.

However, where the entropy coding component 800 is used to code quantized transform coefficient in band 5 and not in bands 0 through 4, the second stage identification module 808 may omit producing one or more of the first data, the second data, or the third data. For example, if the data indicating the location of the last non-zero coefficient in the transform block, received from the first stage identification module 806, indicates that the location of that last non-zero coefficient is less than the location corresponding to the $21^{st}$ index of the transform block, the second stage identification module 808 may not further process the received data. This may, for example, be because, in such a case, each coefficient in band 5 is inherently zero.

Separately, the memory module 810 receives a coefficient map (e.g., a combined coefficient map) from the first stage identification module 806 and stores the received coefficient map in a memory. The memory may, for example, be a local static random access memory (SRAM). For example, the entropy coding component 800 may include the memory. The memory module 810 uses the received coefficient map to store some or all of a video block that includes or is otherwise associated with the input video data 804. For example, where the input video data 804 are quantized transform coefficients, the memory can store the entire transform block that includes those quantized transform coefficients. The memory module 810 stores this data in the memory until it is ready to be processed by video data processing module 812.

The video data processing module 812 receives the first data, the second data, and the third data from the second stage identification module 808. The video data processing module 812 also receives data stored in memory from the memory module 810. The video data processing module 812 can maintain two arrays of N elements each for token class information corresponding to the quantized transform coefficients, for example, where N is the size of the transform block that includes those quantized transform coefficients.

For example, a first array may include 32 elements each representing one context for above neighbor coefficients, and a second array may include 32 elements each representing one context for left neighbor coefficients. After processing one of the quantized transform coefficients (regardless of whether it is a primary coefficient or a secondary coefficient) at a given (x, y) location of the transform block, the token class associated with the above neighbor coefficient for that given location is selected from the first array and the token class associated with the left neighbor coefficient for that given location is selected from the second array.

As such, the above and left neighboring token class information becomes available for processing a coefficient immediately following the processed one of the quantized transform coefficients. This information, taken in combination with other information stored in the memory associated with the memory module 810 (e.g., a cost table) can then be used to determine the number of bits 802 to use to code the input video data 804.

Implementations of the entropy coding component 800 may differ from what is shown and described with respect to FIG. 8. In some implementations, the memory associated with the memory module 810 may be a ping-pong SRAM. In such an implementation, the entropy coding component 800 can parallel process two sets of video data (e.g., quantized transform coefficients of two different transform blocks), for example, by reading a first set into the memory associated with the memory module 810 at the same or a substantially similar time to processing a second set using the video data processing module 812.

In some implementations, the memory module 810 may be omitted. For example, the entropy coding component 800 may instead include the memory to which the input video data 804 are written after being read by the first stage identification module 806.

FIG. 9 is an illustration of a cost table 900 reflecting numbers of bits required to code a token in a coding tree. The cost table 900 may be stored in a memory accessible to a hardware component implementing one or both of the technique 600 or the technique 700, for example, a local SRAM of the entropy coding component 800 shown in FIG. 8. The cost table 900 includes 13 entries. Each entry includes refers to one token class that may be associated with video data (e.g., quantized transform coefficients) to code. The cost table 900 dedicates 128 bits to token classes. Each entry indicates a bit offset for the token class, a number of bits reserved for the token class, a name of the token class, and a description of what the reserved bits are used for.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for determining numbers of bits to use to encode quantized transform coefficients of a transform block, the method comprising:
   storing, within a hardware register, sets of context data corresponding to categories of a probability model available for encoding the quantized transform coefficients;
   identifying one of the quantized transform coefficients as a primary coefficient;
   producing a coefficient map indicating locations of values of at least some of the quantized transform coefficients within the transform block;
   using the coefficient map and data indicating a location of a last non-zero coefficient within the transform block, identifying at least one valid secondary coefficient associated with the primary coefficient;
   identifying one of the categories of the probability model as a category used to encode one or more neighbor coefficients of the primary coefficient and one or more neighbor coefficients of the at least one valid secondary coefficient;
   accessing, in a single clock cycle, the hardware register to retrieve one of the sets of context data associated with the identified category;
   determining a number of bits to use to encode each of the primary coefficient and the at least one valid secondary coefficient based on the retrieved set of context data accessed in the single clock cycle; and
   encoding, to a bitstream, the primary coefficient and the at least one valid secondary coefficient using the number of bits.

2. The method of claim 1, wherein the at least one valid secondary coefficient includes a first secondary coefficient, a second secondary coefficient, and a third secondary coefficient, wherein identifying the at least one valid secondary coefficient associated with the primary coefficient comprises:
   identifying the first secondary coefficient as valid responsive to determining that the first secondary coefficient has a value of zero, that the primary coefficient has a value of zero, and that a location of the primary coefficient within the transform block is before the location of the last non-zero coefficient within the transform block;
   identifying the second secondary coefficient as valid responsive to determining that the second secondary coefficient has a value of zero, that the first secondary coefficient is valid, and that a location of the first secondary coefficient within the transform block is before the location of the last non-zero coefficient within the transform block; and
   identifying the third secondary coefficient as valid responsive to determining that the third secondary coefficient has a value of zero, that the second secondary coefficient is valid, and that a location of the second secondary coefficient within the transform block is before the location of the last non-zero coefficient within the transform block.

3. The method of claim 2, wherein identifying the category of the probability model used to encode the one or more neighbor coefficients of the primary coefficient and one or more neighbor coefficients of the at least one valid secondary coefficient comprises:
   identifying a first category associated with an above neighbor coefficient of the primary coefficient based on locations of above neighbor coefficients of at least one of the first secondary coefficient, the second secondary coefficient, or the third secondary coefficient within the transform block; and
   identifying a second category associated with a left neighbor coefficient of the primary coefficient based on locations of left neighbor coefficients of the at least one of the first secondary coefficient, the second secondary coefficient, or the third secondary coefficient within the transform block.

4. The method of claim 3, wherein determining the number of bits to use to encode the primary coefficient and the at least one secondary coefficient comprises:
   determining a context to use to encode at least one of the primary coefficient, the first secondary coefficient, the second secondary coefficient, or the third secondary coefficient based on the first category and the second category;
   retrieving a bit cost for the context from the hardware register; and
   determining the number of bits based on the bit cost.

5. The method of claim 4, wherein the context reflects a probability that a quantized transform coefficient of the quantized transform coefficients has a value of zero, wherein the hardware register stores 10 bits for the context.

6. The method of claim 2, further comprising:
identifying, as a next primary coefficient, a coefficient immediately following the third secondary coefficient within the transform block.

7. The method of claim 1, wherein the at least one valid secondary coefficient includes up to three valid secondary coefficients.

8. The method of claim 1, wherein the primary coefficient and the at least one valid secondary coefficient are located in band 5 of the transform block.

9. An apparatus for determining numbers of bits to use to encode quantized transform coefficients of a transform block, the apparatus comprising:
a processor configured to execute instructions stored in a non-transitory storage medium to:
store, within a hardware register, sets of context data corresponding to categories of a probability model available for encoding the quantized transform coefficients;
identify one of the quantized transform coefficients as a primary coefficient;
identify at least one valid secondary coefficient associated with the primary coefficient, the at least one valid secondary coefficient located before a last non-zero coefficient within the transform block;
identify one of the categories of the probability model as a category used to encode one or more neighbor coefficients of the primary coefficient and one or more neighbor coefficients of the at least one valid secondary coefficient;
access, in a single clock cycle, the hardware register to retrieve one of the sets of context data associated with the identified category;
determine a number of bits to use to encode each of the primary coefficient and the at least one valid secondary coefficient based on the retrieved set of context data accessed in the single clock cycle; and
encode, to a bitstream, the primary coefficient and the at least one valid secondary coefficient using the number of bits.

10. The apparatus of claim 9, wherein the at least one valid secondary coefficient includes a first secondary coefficient, a second secondary coefficient, and a third secondary coefficient, wherein the instructions to identify the at least one valid secondary coefficient associated with the primary coefficient include instructions to:
identify the first secondary coefficient as valid responsive to determining that the first secondary coefficient has a value of zero, that the primary coefficient has a value of zero, and that a location of the primary coefficient within the transform block is before the location of the last non-zero coefficient within the transform block;
identify the second secondary coefficient as valid responsive to determining that the second secondary coefficient has a value of zero, that the first secondary coefficient is valid, and that a location of the first secondary coefficient within the transform block is before the location of the last non-zero coefficient within the transform block; and
identify the third secondary coefficient as valid responsive to determining that the third secondary coefficient has a value of zero, that the second secondary coefficient is valid, and that a location of the second secondary coefficient within the transform block is before the location of the last non-zero coefficient within the transform block.

11. The apparatus of claim 10, wherein the instructions to identify the category of the probability model used to encode the one or more neighbor coefficients of the primary coefficient and one or more neighbor coefficients of the at least one valid secondary coefficient include instructions to:
identify a first category associated with an above neighbor coefficient of the primary coefficient based on locations of above neighbor coefficients of at least one of the first secondary coefficient, the second secondary coefficient, or the third secondary coefficient within the transform block; and
identify a second category associated with a left neighbor coefficient of the primary coefficient based on locations of left neighbor coefficients of the of at least one of the first secondary coefficient, the second secondary coefficient, or the third secondary coefficient within the transform block.

12. The apparatus of claim 11, wherein the instructions to determine the number of bits to use to encode the primary coefficient and the at least one secondary coefficient include instructions to:
determine to use the context to encode at least one of the primary coefficient, the first secondary coefficient, the second secondary coefficient, or the third secondary coefficient based on the first category and the second category;
retrieve a bit cost for the context from a hardware register; and
determine the number of bits based on the bit cost.

13. The apparatus of claim 12, wherein the number of bits to use to encode the primary coefficient, the first secondary coefficient, the second secondary coefficient, and the third secondary coefficient is determined in a single clock cycle.

14. The apparatus of claim 12, wherein the context reflects a probability that a quantized transform coefficient of the quantized transform coefficients has a value of zero, wherein the hardware register stores 10 bits for the context.

15. The apparatus of claim 10, wherein the instructions include instructions to:
identify, as a next primary coefficient, a coefficient immediately following the third secondary coefficient within the transform block.

16. The apparatus of claim 9, wherein the at least one valid secondary coefficient includes up to three valid secondary coefficients.

17. The apparatus of claim 9, wherein the primary coefficient and the at least one valid secondary coefficient are located in band 5 of the transform block.

18. A method for determining numbers of bits to use to encode quantized transform coefficients of a transform block, the method comprising:
storing, within a hardware register, sets of context data corresponding to categories of a probability model available for encoding the quantized transform coefficients;
identifying one of the quantized transform coefficients as a primary coefficient;
identifying a quantized transform coefficient immediately following the primary coefficient within the transform block as a secondary coefficient;
determining that the secondary coefficient is valid based on a value of the primary coefficient, a value of the secondary coefficient, and a location of a last non-zero quantized coefficient within the transform block;
identifying one of the categories of the probability model as a category used to encode one or more neighbor coefficients of one or more of the primary coefficient or the valid secondary coefficient;

determining a context to use to encode the primary coefficient and the valid secondary coefficient based on the identified category;

accessing, in a single clock cycle, the hardware register to retrieve one of the sets of context data associated with the context to use to encode the primary coefficient and the valid secondary coefficient;

determining a number of bits to use to encode the primary coefficient and the valid secondary coefficient based on the retrieved set of context data accessed in the single clock cycle; and encoding, to a bitstream, the primary coefficient and the valid secondary coefficient using the number of bits.

19. The method of claim 18, wherein the number of bits to use to encode the primary coefficient and the valid secondary coefficient is determined in a single clock cycle by retrieving a bit cost for the context from a hardware register.

20. The method of claim 18, wherein determining the number of bits to use to encode the primary coefficient and the valid secondary coefficient comprises:

identifying a first category associated with an above neighbor coefficient of the primary coefficient based on a location of an above neighbor coefficient of the valid secondary coefficient within the transform block;

identifying a second category associated with a left neighbor coefficient of the primary coefficient based on a location of a left neighbor coefficient of the valid secondary coefficient within the transform block; and determining the context based on at least one of the first category or the second category.

* * * * *